US011072405B2

(12) United States Patent
Larson et al.

(10) Patent No.: US 11,072,405 B2
(45) Date of Patent: Jul. 27, 2021

(54) AUTONOMOUS UNDERWATER SURVEY APPARATUS AND SYSTEM

(71) Applicant: TAMPA DEEP-SEA X-PLORERS LLC, Tampa, FL (US)

(72) Inventors: Edward Larson, Tampa, FL (US); Arthur Ianuzzi, Tampa, FL (US); Renier Oliva, Tampa, FL (US); Dennis Lorence, Tampa, FL (US); Joseph R. Daum, Tampa, FL (US); Graham Sheffer, Land O Lakes, FL (US)

(73) Assignee: TAMPA DEEP-SEA X-PLORERS LLC, Tampa, FL (US)

( * ) Notice: Subject to any disclaimer, the term of this patent is extended or adjusted under 35 U.S.C. 154(b) by 137 days.

(21) Appl. No.: 16/173,567

(22) Filed: Oct. 29, 2018

(65) Prior Publication Data
US 2019/0127034 A1    May 2, 2019

Related U.S. Application Data

(60) Provisional application No. 62/580,082, filed on Nov. 1, 2017.

(51) Int. Cl.
*B63G 8/16*    (2006.01)
*B63G 8/14*    (2006.01)
(Continued)

(52) U.S. Cl.
CPC .............. *B63G 8/001* (2013.01); *B63G 8/14* (2013.01); *B63G 8/16* (2013.01); *G01S 7/4808* (2013.01); *G01S 7/4815* (2013.01); *G01S 15/89* (2013.01); *G01S 17/08* (2013.01); *G01S 17/87* (2013.01); *G01S 17/88* (2013.01); *G01S 17/89* (2013.01); *G01S 17/93* (2013.01); *B63G 8/38* (2013.01);
(Continued)

(58) Field of Classification Search
CPC ................................ B63G 8/001; G01S 15/89
See application file for complete search history.

(56) References Cited

U.S. PATENT DOCUMENTS 1,750,959 A * 3/1930 Lake ......................... B63B 1/22
114/282
2,359,366 A * 10/1944 Katcher ................... B63G 8/42
114/245
(Continued)

FOREIGN PATENT DOCUMENTS

CN    102193276 A * 9/2011

*Primary Examiner* — Shelley Chen
(74) *Attorney, Agent, or Firm* — Alston & Bird LLP

(57) ABSTRACT

The present disclosure relates to sea floor mapping, and more particularly to a method, system, and apparatus for mapping a large swath of sea floor at substantial depths. An example autonomous underwater vehicle may include: a controller; a body having a front end and a rear end and defining a cavity and a center of gravity; a first dive plane extending from the body proximate the center of gravity; a second dive plane extending from the body substantially opposite of the first dive plane proximate the center of gravity; a counterweight disposed within the cavity configured to be moved between the front end and the rear end of the body, wherein a fore-aft pitch of the body of the autonomous underwater vehicle is controlled by the controller through movement of the counterweight toward the front end or the rear end of the body.

17 Claims, 6 Drawing Sheets

(51) Int. Cl.
*B63G 8/00* (2006.01)
*G01S 15/89* (2006.01)
*G01S 17/87* (2020.01)
*G01S 17/89* (2020.01)
*G01S 7/48* (2006.01)
*G01S 17/08* (2006.01)
*G01S 17/88* (2006.01)
*G01S 17/93* (2020.01)
*G01S 7/481* (2006.01)
*G05D 1/02* (2020.01)
*G05D 1/04* (2006.01)
*B63G 8/38* (2006.01)

(52) U.S. Cl.
CPC .. *B63G 2008/004* (2013.01); *B63G 2008/005* (2013.01); *G05D 1/0206* (2013.01); *G05D 1/048* (2013.01)

(56) References Cited

U.S. PATENT DOCUMENTS

| | | | | |
|---|---|---|---|---|
| 3,183,871 A | * | 5/1965 | Reder | B63B 1/286 114/281 |
| 3,521,589 A | * | 7/1970 | Kemp | B63G 8/16 114/330 |
| 4,455,962 A | * | 6/1984 | Gongwer | B63H 5/00 114/124 |
| 5,291,847 A | * | 3/1994 | Webb | B63G 8/08 114/331 |
| 5,349,915 A | * | 9/1994 | Thomas | B63B 39/02 114/124 |
| 6,305,309 B1 | * | 10/2001 | Ead | B63G 8/14 114/242 |
| 7,874,513 B1 | * | 1/2011 | Smith | B64C 29/0033 244/12.4 |
| 8,265,809 B2 | * | 9/2012 | Webb | G05D 1/0692 701/21 |
| 9,096,106 B2 | * | 8/2015 | Hanson | B60F 5/00 |
| 9,290,237 B1 | * | 3/2016 | Lin | B63B 1/322 |
| 9,493,235 B2 | * | 11/2016 | Zhou | G06Q 20/367 |
| 9,669,904 B2 | * | 6/2017 | Hanson | G05D 1/0088 |
| 10,331,131 B2 | * | 6/2019 | Hanson | B63G 8/22 |
| 2010/0185348 A1 | * | 7/2010 | Webb | G01C 13/002 701/21 |
| 2012/0290164 A1 | * | 11/2012 | Hanson | B60F 5/00 701/23 |
| 2015/0370252 A1 | * | 12/2015 | Hanson | B63B 1/042 701/2 |
| 2016/0114887 A1 | * | 4/2016 | Zhou | H04N 5/265 348/148 |
| 2017/0074664 A1 | * | 3/2017 | Cheramie | G05D 1/0875 |
| 2017/0174300 A1 | * | 6/2017 | Moreno | G05D 1/0875 |
| 2017/0300054 A1 | * | 10/2017 | Hanson | B63B 1/32 |
| 2020/0017180 A1 | * | 1/2020 | Axelsson | B63G 8/26 |

* cited by examiner

AUTONOMOUS UNDERWATER SURVEY APPARATUS AND SYSTEM

CROSS-REFERENCE TO RELATED APPLICATIONS

This application claims priority to U.S. Provisional Patent Application Ser. No. 62/580,082, filed on Nov. 1, 2017, the contents of which are hereby incorporated by reference in their entirety.

TECHNOLOGICAL FIELD

The present invention relates to sea floor mapping, and more particularly, to a method, apparatus, and system for mapping a large swath of more than 100 square kilometers of the sea floor at depths of over 2,400 meters autonomously using a plurality of deployed autonomous underwater vehicles.

BACKGROUND

The deep ocean represents one of the last frontiers easily accessible to the human race. Like other great frontiers of the past, the deep ocean offers great rewards for those who dare to venture there, but these rewards also come with risks. While the Earth is approximately 70% covered in water, less than 20% of underwater surfaces have been mapped. Mapping sea floors and ocean beds is a difficult task, particularly when depths reach thousands of feet, such that little is known about the intricacies of the underwater surfaces of the Earth.

BRIEF SUMMARY

Provided herein is a system and apparatus for mapping of the sea floor and for capturing images of objects of interest on the sea floor. Methods described herein include swarms of underwater drones that are capable of descending to depths greater than 2,000 meters of seawater to perform a variety of tasks. Example underwater drones are smaller, lighter, faster, and able to dive deeper than those which are currently available in the commercial market. Embodiments described herein represent a major breakthrough in subsea technology.

The underwater vehicles described herein can be operated remotely (remotely operated vehicle—ROV) or can be deployed to operate autonomously, such as an Autonomous Underwater Vehicle (AUV) depending on the needs of the mission, but are collectively referred to as AUV throughout the document. They can be deployed as a single unit or as part of a swarm. Current development has focused on swarms of 10 to 20 units, but larger swarms are possible. The basic AUV is approximately 36 inches long and weigh around 20 pounds (9 kg). They are small and lightweight when compared with other deep-water vehicles and can easily be deployed from a small craft by hand or can be deployed automatically by mechanical means.

Underwater operations present a special set of obstacles which do not apply to surface or air vehicles. These include, but are not limited to, extreme pressures at depth, limited visibility, absorption of radio signals, and low bandwidth availability. These obstacles often prevent or limit the use of direct or line-of-sight communications, such as: radio communications, visual observation, direct video links, and GPS for navigation.

Example embodiments of autonomous underwater vehicles described herein serve as platforms for a variety of sensing devices, including but not limited to: video cameras, LiDAR, side scan SONAR, acoustic modems, spectrophotometer, fluorimeter, thermometer, bathometer, and pH meter. These sensors can be used to perform a variety of missions including: reconnaissance, bathymetry, mapping, search and recovery, intruder detection, chemical detection, and tracking.

A swarm of these AUVs could easily map a harbor within a 24-hour period and return with detailed data regarding depth, water temperature, obstacles, hazards, and potential targets. The AUVs could also detect specific chemicals and trace them to their source. This data would be invaluable for harbor protection, anti-smuggling efforts, environmental protection, as well as military applications.

Embodiments described herein may provide an autonomous underwater vehicle comprising: a controller; a body having a front end and a rear end and defining a cavity and a center of gravity; a first dive plane extending from the body proximate the center of gravity; a second dive plane extending from the body substantially opposite of the first dive plane proximate the center of gravity; a counterweight disposed within the cavity configured to be moved between the front end and the rear end of the body, wherein a fore-aft pitch of the body of the autonomous underwater vehicle is controlled by the controller through movement of the counterweight toward the front end or the rear end of the body. The counterweight may be disposed proximate the center of gravity of the body between the front end and the rear end in response to no pitch being commanded by the controller.

According to some embodiments, the first dive plane may be attached at a first end to the body, where the second dive plane may be attached at a first end to the body, where the autonomous underwater vehicle may further include: a first propeller disposed proximate a second end of the first dive plane, opposite the first end; and a second propeller disposed proximate a second end of the second dive plane, opposite the first end. The controller may be configured to cause the autonomous underwater vehicle to turn in response to differential control of the first propeller and the second propeller. The controller may be configured to cause the front end of the body to pitch up in response to causing the counterweight to move toward the rear end of the body.

According to some embodiments, the autonomous underwater vehicle may include: a first laser and a second laser, where the first laser projects a first laser beam to a spot in front of the autonomous underwater vehicle, and wherein the second laser beam projects an array of laser beams to a field of view in front of the autonomous underwater vehicle. An image capture device having a field of view may include the field of view of the first array of laser beams and the first spot, where the image capture device may be configured to map a surface covered by the field of view of the first array of laser beams. The controller may be configured to receive data from the image sensor device, process the data, and generate bathymetric data of the surface covered by the field of view of the first array of laser beams. The autonomous underwater vehicle of some embodiments may include a gyrometer, an accelerometer, a compass, and a pressure transducer, where the controller may be configured to process data from the gyrometer, accelerometer, compass, and pressure transducer to facilitate autonomous navigation of the autonomous underwater vehicle within a predetermined area under water.

Embodiments described herein may provide an autonomous underwater vehicle including: a controller; a body having a front end and a rear end defining a cavity; a first dive plane extending from the body; a second dive plane extending from the body substantially opposite of the first dive plane; a first LiDAR system; and a second LiDAR system, where the first LiDAR system projects a single laser beam in front of the body and is configured to determine a height above the sea floor, wherein the second LiDAR system projects an array of laser beams in front of the body and is configured to detect objects in front of the autonomous vehicle under water. The second LiDAR system may be configured to generate bathymetric data of the sea floor. The autonomous underwater vehicle may include a counterweight disposed within the cavity configured to be moved between the front end and the rear end of the body, where a fore-aft pitch of the body of the autonomous underwater vehicle may be controlled by the controller in response to movement of the counterweight toward the front end or the rear end of the body.

According to some embodiments, the autonomous underwater vehicle may include: a gyrometer; an accelerometer; a compass; and a pressure transducer. The controller may be configured to process data from the gyrometer, accelerometer, compass, and pressure transducer to facilitate autonomous navigation of the autonomous underwater vehicle within a predetermined area under water. The second LiDAR system may be configured to produce bathymetric data of the sea floor for the predetermined area under water. The controller may be configured to, in response to the second LiDAR system producing bathymetric data of the sea floor for the predetermined area under water, cause the AUV to ascend to a surface of the water and travel to a predetermined location.

BRIEF DESCRIPTION OF THE DRAWINGS

Figure 1:
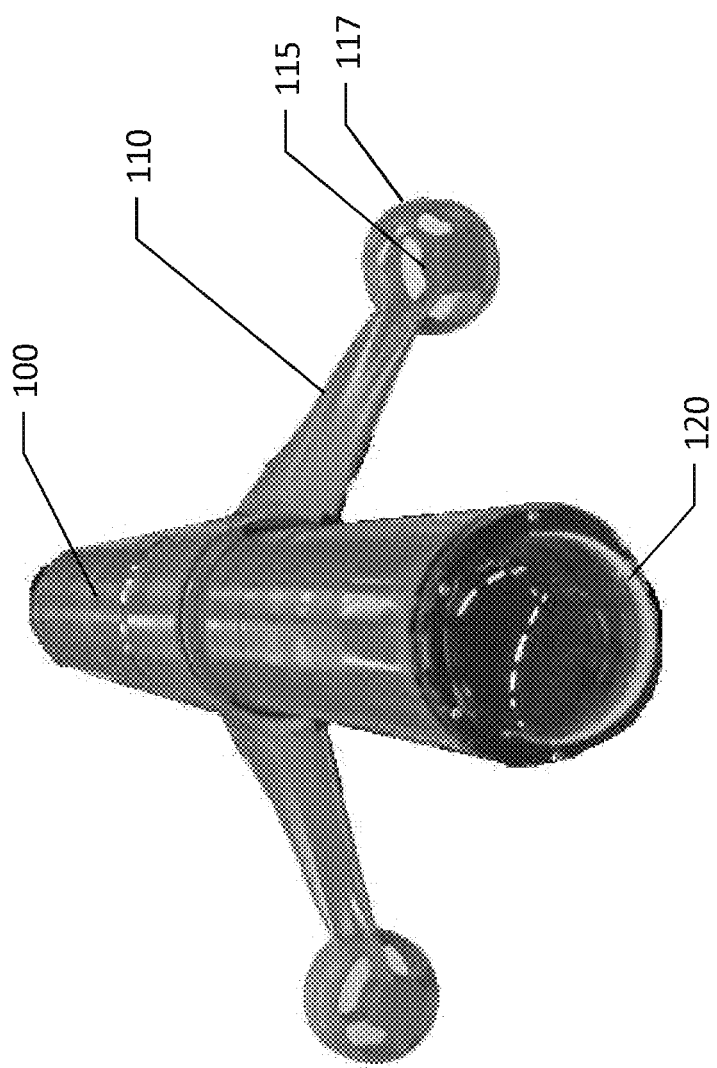
Figure 2:
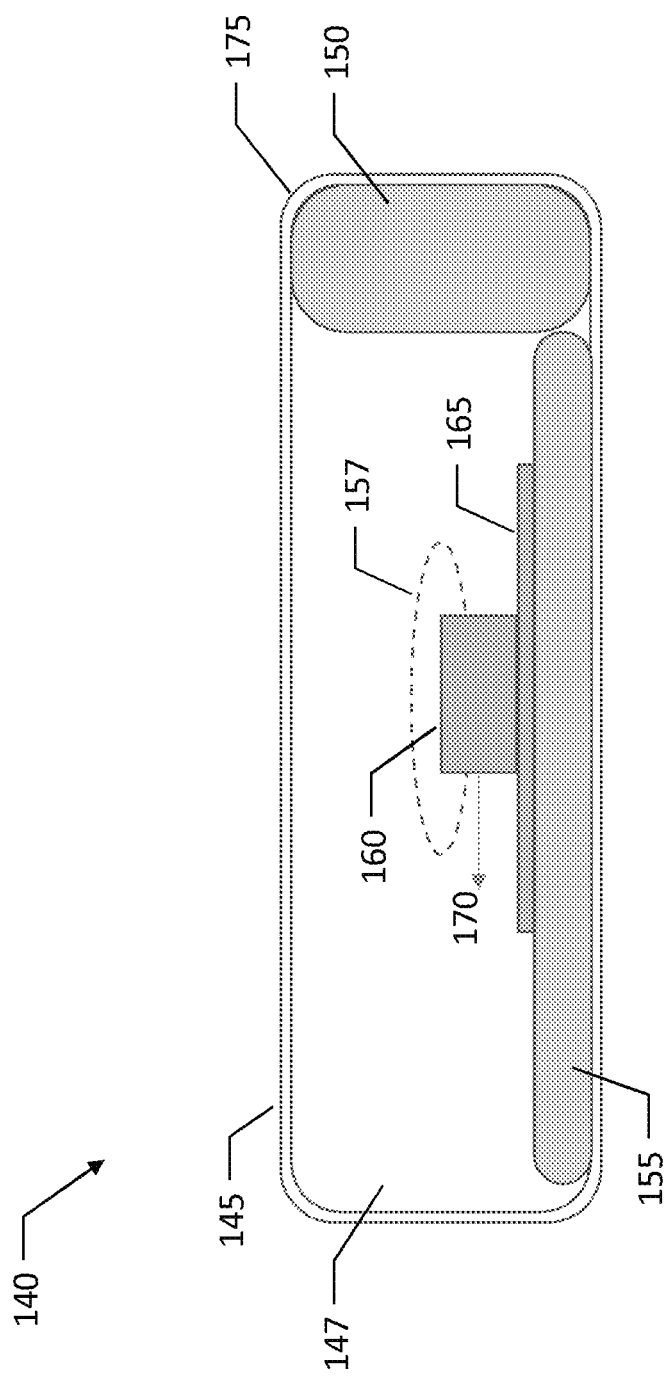
Figure 3:
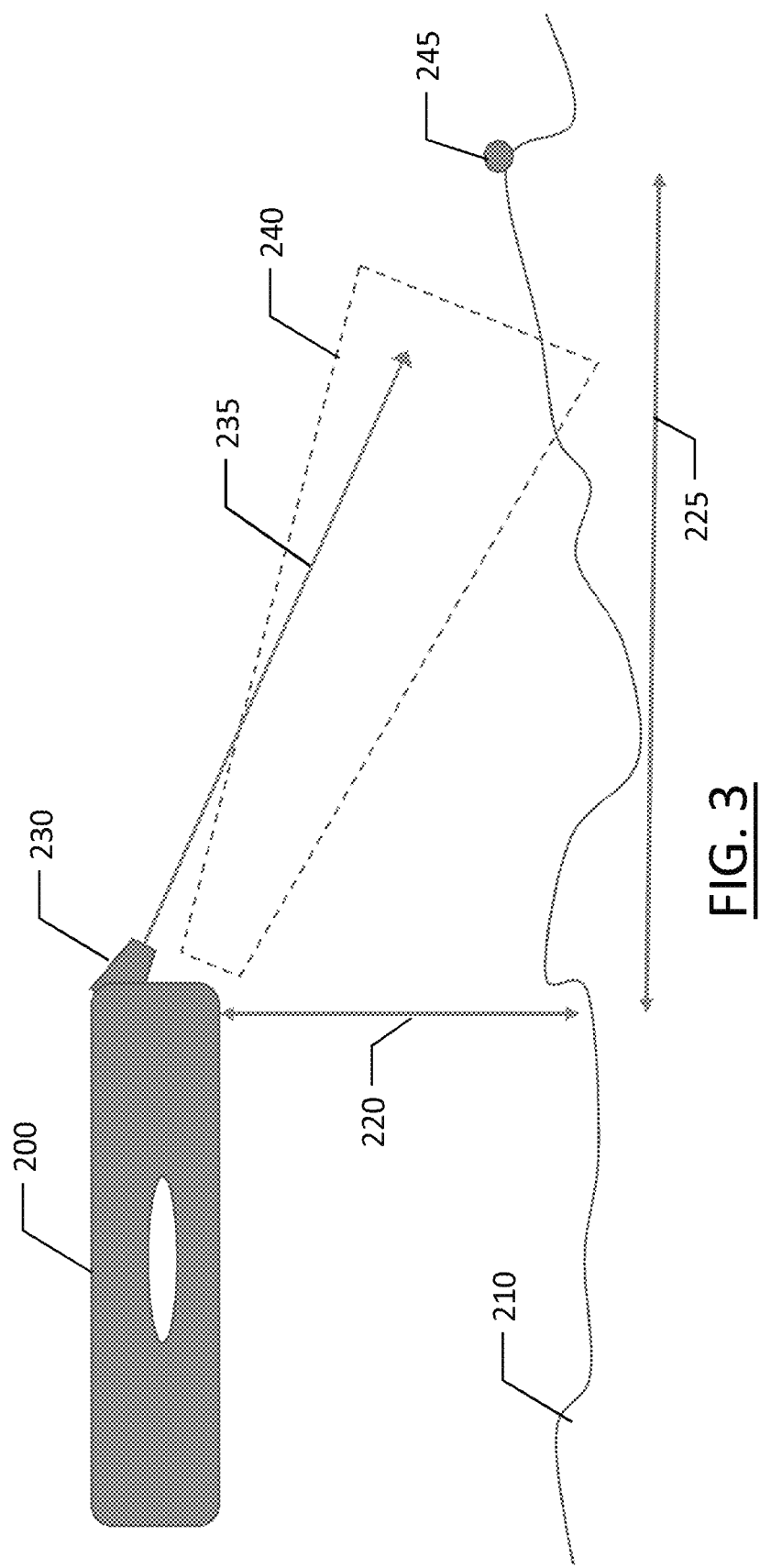
Figure 4:
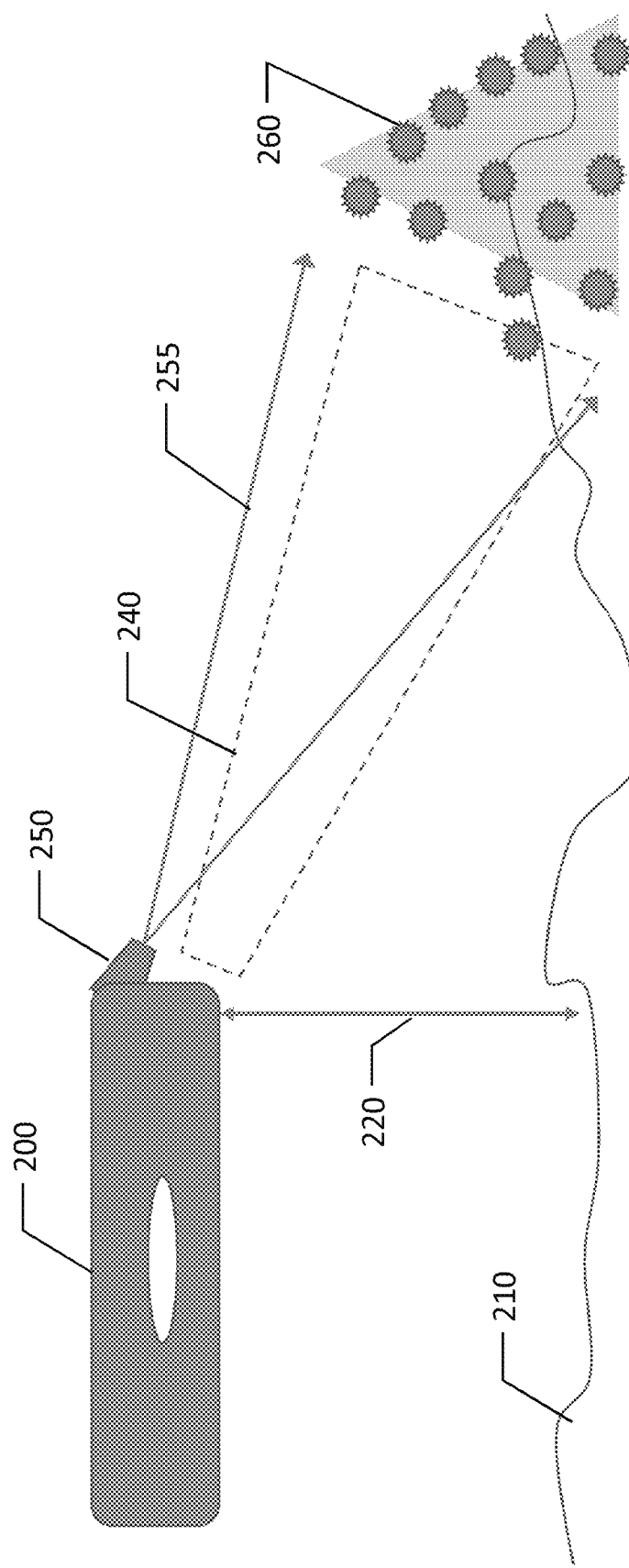
Figure 5:
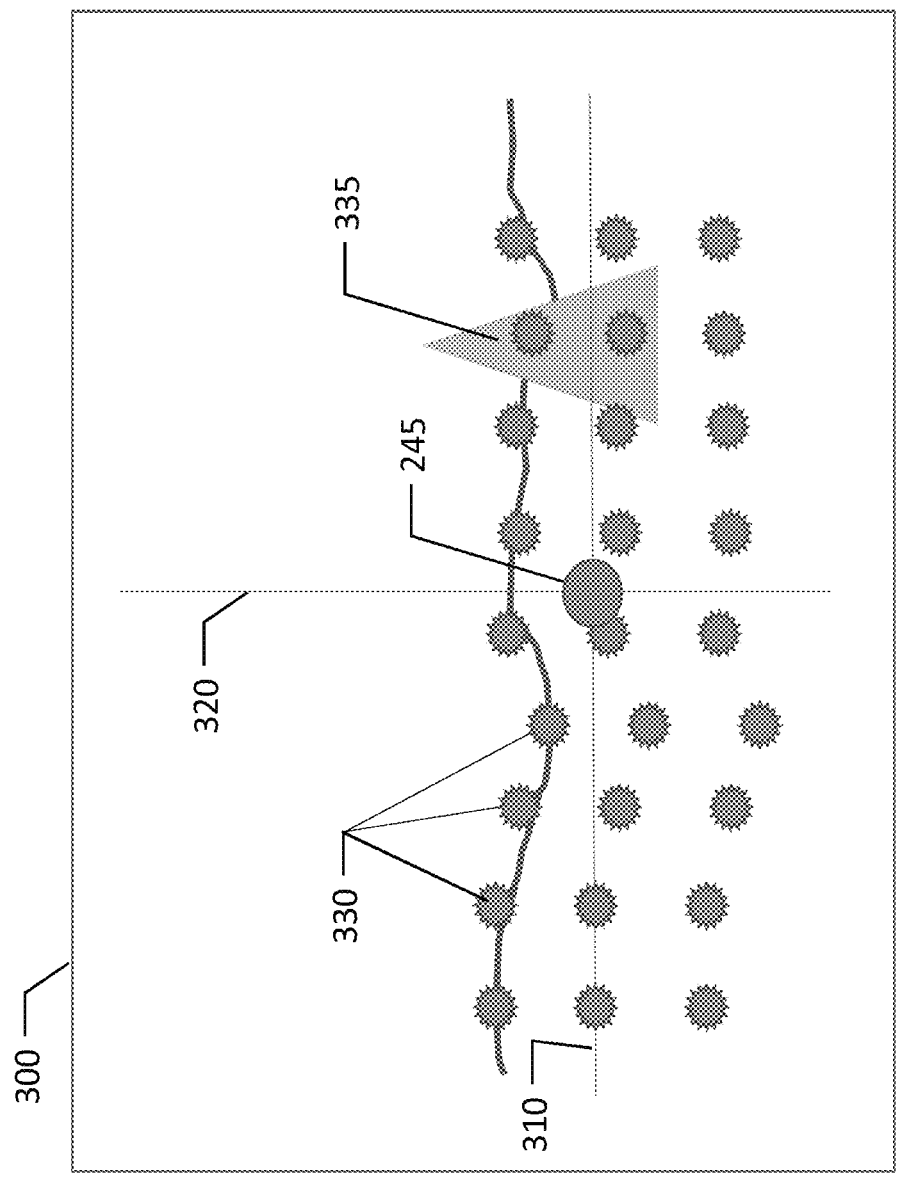
Figure 6:
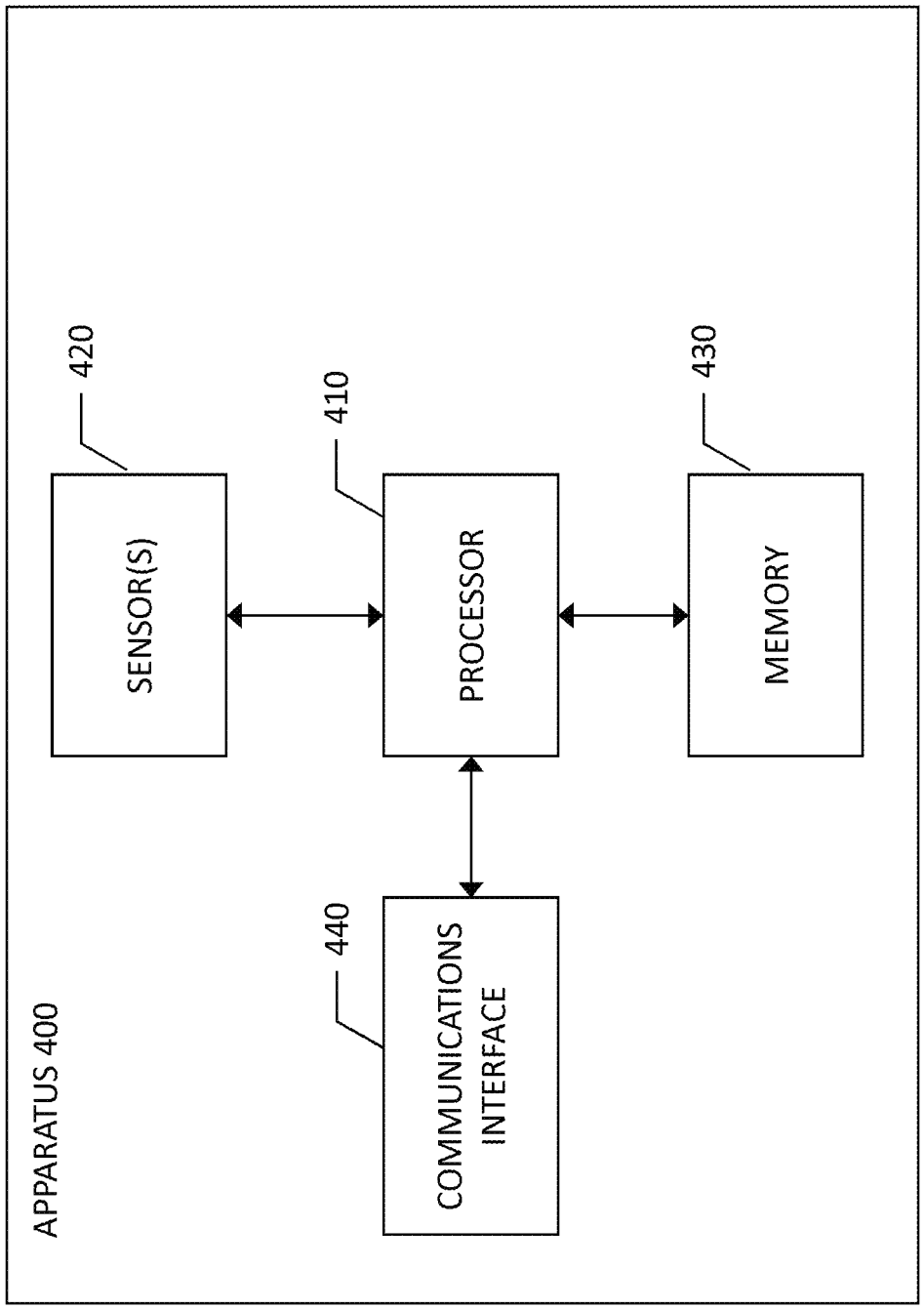

Having thus described the invention in general terms, reference will now be made to the accompanying drawings, which are not necessarily drawn to scale, and wherein:

FIG. 1 illustrates an AUV according to an example embodiment of the present disclosure;

FIG. 2 illustrates a section view of an example embodiment of an AUV according to an example embodiment of the present disclosure;

FIG. 3 depicts an AUV including a first LiDAR system for range measurement according to an example embodiment of the present disclosure;

FIG. 4 depicts an AUV including a second LiDAR system for feature measurement and mapping according to an example embodiment of the present disclosure;

FIG. 5 depicts a field of view including the first and second LiDAR systems according to an example embodiment of the present disclosure; and FIG. 6 illustrates a schematic diagram of an example apparatus which may be implemented to perform the functions described herein according to an example embodiment of the present disclosure.

DETAILED DESCRIPTION

Example embodiments of the present disclosure now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the present disclosure generally relate to an autonomous underwater vehicle (AUV) that is able to survey and map large areas (e.g., 36 square kilometers or more) at depths of 2,000 meters or greater. The AUV of example embodiments may generate a bathymetric map of the sea floor and generate high-definition images of specified features such as archeological, biological, or geological features. Example AUVs may use low-power sensors to collect temperatures, depths, capture still and video images, capture sonar/bathymetric data, and LiDAR data. A plurality of AUVs may be deployed from a fully-autonomous deployment vehicle; which may include a floating vessel such as a catamaran-hull vessel of sufficient size to carry the plurality of AUVs.

FIG. 1 illustrates an example embodiment of an AUV as described herein. The AUV of example embodiments may be sized according to the specific use case and sensor package of the AUV; however, a preferred embodiment may be approximately 3.3 feet (1 meter) long, 2 feet (0.6 meters) wide, and weigh around 20 pounds (7.8 kilograms). The depicted AUV of FIG. 1 includes a pressure vessel 100 that houses batteries, electronics, and a counterweight system. Two dive planes 110 may be attached to the pressure vessel 100 which provide dynamic pressure to enable the AUVs to dive. The dive planes 110 also serve as mounts for two brushless, DC motors that provide thrust via respective propellers 115. The pressure vessel 100 including the end caps 120 may be configured to withstand pressures to at least 2,000 meters.

According to the illustrated embodiment of FIG. 1, the dive planes and fins 110 may be made of syntactic foam which provides buoyancy, impact durability, and non-compressive structure even at substantial depths. The motor mounting and housings 117 may be made of syntactic foam for the same reasons as the dive planes. The end caps 120 may be rated to pressures above the expected operational depth of the AUV, and may be attached to the pressure vessel through, for example, a dual O-ring cylinder-in-cylinder configuration. The propulsion system of the illustrated embodiment includes brushless motors, electronic speed controls, and housings 117. The brushless motors may be of a solid state design, void of gas pockets to accommodate operational pressures at depth, while the windings and rotor may be coated in a corrosion preventative material. The dive planes 110 may be angled down relative to the body such that when the AUV is at the surface of the water, the propellers remain submerged.

The sensors configured as described below may be situated behind the end cap 120, particularly those sensors requiring a line of sight from the sensor to the environment. The sensors may be vacuum potted in a sensor housing to eliminate gas pockets to provide an environment that does not enable or hinder normal operational function, whether or not the vessel is in or out of water.

The AUV of example embodiments may further include a sensor package enclosed within a housing 120 attached to the front of the AUV, which may contain sensors, such as: a low-power laser-based LiDAR (Light Distancing and Ranging) system, a video camera, a GPS (Global Positioning System) antenna, a GPU (Graphic Processing Unit), a CPU (Computer Processing Unit), and a depth sensor. The sensor package may optionally contain other mission specific sensors, such as: a fluorometer, a thermometer, pH meter, single or multibeam sonar, etc., for information gathering. The electronics in the sensor head may be potted and may be configured to withstand pressures at depths of 2,000 meters or more.

The pressure vessel of example embodiments may be based on a hollow or substantially hollow cylindrical tube that has been adapted to house electronic components and batteries. The tube may be constructed of a variety of materials, including but not limited to plastic, composite, and aircraft quality aluminum, or steel; dependent upon mission requirements.

Mounted on the outside of the pressure vessel there are two stationary dive planes 110. These provide dynamic force to cause the AUV to ascend or descend as required by the navigation and obstacle avoidance programs. When the AUV is traveling in a level attitude the dive planes are in a preset position to counteract the buoyancy of the AUV. The dive planes drive the AUV up or down using dynamic force when the nose is in an up or down position, which is accomplished by shifting the AUV's center of gravity.

The AUV shifts its center of gravity using an internal counterweight that is shifted forward or backward on an internal carriage assembly. Moving the counterweight forward or aft on the carriage and rail assembly causes the center of gravity of the AUV to change, and consequently the nose of the AUV will pitch up or down and the dynamic force of water flowing over the dive planes causes the AUV to rise or dive. The dive planes may be cast from syntactic foam, contain the lights for the video camera, and also serve as the mounting structure for the brushless motors.

Example AUVs may be powered by four 10,000 mah (milliamp hour) Lithium Ion batteries. The internal batteries power the internal electronics package and the additional sensor packages that could consist of: CPU/GPU unit, sensor package, LiDAR system, GPS, and video camera. The internal electronics may draw approximately 1 amp of current. In an example embodiment, each of the motors may draw approximately 1.3 amps of current at minimum cruising speed and 3.2 amps of current at maximum cruising speed. The video camera lights may draw an additional 0.5 amp.

The AUV as described herein may incorporate an internal counterweight system and dive plane mechanism that provides unique stability and suitability of the disclosed AUVs for operating autonomously underwater. Embodiments of the AUV disclosed herein incorporate a unique pitch and yaw control. While conventional torpedo shaped designs having a single aft-located motor rely on control vanes at the aft end of the body, such conventional designs require actuators to move control surfaces which produce dynamic force to turn and dive the AUV. In contrast, embodiments described herein use dive planes located on the center of gravity of the vehicle's body tube and an internal counterweight system to turn and drive the AUV.

The internal counterweight may be moved internally to shift the center of gravity to provide pitch control. The AUV can be pitched up or down by as much as thirty degrees due to dynamic forces acting on the dive planes. These dive planes may be static and may thus reduce the moving external components that provide potential modes of failure in conventional underwater vehicles.

FIG. 1 illustrates an example embodiment in which the AUV includes a body 100 and dive planes 110 located on either side of the body. The dive planes 110 also serve as motor mounts for motor driven propellers using waterproof brushless motors. The two motors and propellers, one mounted on each dive plane, may be counter rotating to reduce the inertial effects of the rotation of the propellers.

A benefit of the design using the movement of the internal counterweight along a carriage/rail system within the body results in no external actuators required to move control surfaces, such that the design is simpler and more robust, which reduces the likelihood of control surface failure. Further, embodiments are more agile than a conventional submersible allowing the AUV described herein to turn a full 360 degrees within its own body length by operating the two propellers mounted to the dive planes in opposite directions.

FIG. 2 illustrates a section view of an example embodiment of an AUV as described herein. It is appreciated that the components of the AUV of FIG. 2 are simplified for ease of understanding and do not reflect the complexities or packaging within the AUV. As shown, the AUV 140 of FIG. 2 includes a body 145, shown sectioned to expose the inside. A cavity 147 defined within the body 145 may include a sensor array 150 that may include various components as described in greater detail below, and which may be distributed throughout the cavity rather than in the position shown. Also within the cavity 147 may be one or more batteries 155, generally positioned along a bottom of the body 145 to provide ballast and orient the AUV in water.

A dive plane, shown as dashed line 157, may be disposed proximate a center of gravity of the AUV. A counterweight 160 may also be disposed proximate the center of gravity of the AUV 145 in a neutral position when no pitch is desired. The counterweight 160 may be disposed on a rail 165 system along which the counterweight 160 may move. The counterweight may be moved fore and aft along the rail 165 based on a control signal from a propulsion controller to guide the AUV. The counterweight 160 may be moved aft along arrow 170 to cause the nose 175 of the AUV 140 to pitch up for ascent, while the counterweight may move in the opposite direction, away from arrow 170, to cause the nose 175 to pitch down for descent. This counterweight system may eliminate the need for control surfaces that pitch to control an AUV. Further, the two motors and propellers mounted opposite one another on the dive planes may provide steering through independent operation. Through these techniques, full control of the AUV may be provided with few moving parts and with greater reliability than dive planes that move relative to a body of the AUV.

During data collection, the AUVs could follow the contours of the ocean bottom along a preprogrammed course, altitude, and speed. Collected sensor and image data could then be recorded to an internal storage media and processed at the surface to extract map information. Utilizing the collected data, a topographical map could be made from: high-resolution LiDAR data, high-resolution video images, sonar data, along with position and depth information.

In seawater, the AUV of example embodiments is approximately 0.5lb (226g) buoyant. Thrust from the motors and dynamic forces over the dive planes are used to propel the AUV forward and downward. If power to the AUV is lost, it will eventually surface on its own. All abort scenarios cause the AUV to surface and activate a locator beacon so that it can be retrieved.

Bathymetric Imaging

As described above, embodiments of the present disclosure may be configured to map the floor of a body of water, which may include lakes, seas, oceans, etc. The bottom of a body of water may be generically referred to herein as the "sea floor" where embodiments of the present disclosure map the sea floor in an efficient manner not previously possible. There are various techniques that may be used to map the sea floor, of which SONAR is most common. However, SONAR suffers from limitations that inhibit the speed of sea floor mapping. SONAR using sound pulses may be more susceptible to error when used at relatively high speeds due to factors such as the Doppler effect when the speed of travel of a submersible is not negligible relative to the speed of sound in the water.

Embodiments described herein use light, rather than sound, to map the sea floor with a unique implementation of LiDAR technology. While SONAR may be used in conjunction with LiDAR in certain hybrid embodiments, particularly where LiDAR is limited or error prone (e.g., in cloudy/murky water), LiDAR may be the primary mapping method in various embodiments due to the advantages identified below.

Embodiments of the present disclosure use a novel LiDAR system that operates on two different wavelengths of lasers and a digital camera connected to a GPU/CPU. The two different laser wavelengths function as two LiDAR systems sharing a receiver with each wavelength of light used to obtain different data.

FIG. 3 illustrates an example embodiment including an AUV 200 traveling along a sea floor 210 at an altitude shown by arrow 220. The LiDAR system of the example embodiment uses a laser 230 producing a laser beam 235 of a first wavelength, which may be oriented along the centerline of the AUV and set at an angle impinging upon the substantially horizontal sea floor. The laser 230 may emit a single beam of light to a single point 245 in front of the AUV that will intersect the sea floor surface at some distance 225 ahead of the AUV and, preferably, within the field of view (for most water conditions) of the digital camera, represented by 240.

For example, if the AUV 200 is traveling at a depth of twenty feet from the sea floor 210 measured along 220, and the laser 230 is directed at a downward angle from the centerline of the AUV of 45 degrees, the point of laser light will be seen twenty feet in front of the AUV 200, provided the sea floor is substantially level. If the vehicle descends to ten feet above the bottom, the laser point will be seen approximately ten feet in front of the vehicle. If the contour of the sea floor 210 varies or undulates, then the laser point will be seen to move up and down in the field of view. By measuring the position of this point in the field of view, the GPU/CPU unit can calculate the distance from the bottom, the depth of the field of view, and the basic contour of the sea floor in front of the AUV. The algorithm may use a lookup table that corresponds to the laser dot 245 position at a specific distance. The distance may initially be determined by trigonometry before it is entered into the lookup table.

FIG. 4 illustrates a second laser 250 of the AUV 200 that may project a matrix or array of points of light 260 within field 255 in front of the AUV in a direction of the centerline of the AUV 200, but angled downward toward the sea floor within the field of view of the digital camera. The GPU/CPU unit may be programmed to recognize the individual points of light based on their color and shape. The GPU/CPU unit may then calculate the relative positions of the points of light, assign an index number to them for tracking from frame to frame, and calculate the size of each point and distance from the center of the field of view. This system creates a three-dimensional LiDAR system and the matrix of points is used to detect obstacles in the path of the AUV 200.

The system provides the vehicle with a basic machine vision capability using the lasers 230, 250 and the camera 240. The system described herein uses geometry of the laser points to determine distance between points, and the distance of each point from the vehicle. The system described herein does not rely on moving parts to scan the field of view or on time-of-flight of the signals for the distance detection.

According to the embodiments described herein, the two LiDAR systems cooperate to provide a comprehensive LiDAR system that provides unique advantages over existing technologies. The first system provides information to the CPU to maintain a desired distance above the bottom to conduct mapping operations and also provides a reference point in determining the depth of field. The second system then uses the depth of field to establish the horizon for the field of view that aids in weighting the various points of light to determine if they represent obstacles that must be avoided, or if they are simply minor features that require no action on the part of the AUV.

The GPU/CPU may be programmed to divide the field of view into four quadrants. The segments of the quadrants may not necessarily be of equal size. The right side of the field of view may be divided from the left along the center line. A horizontal line may divide the top from the bottom, and the horizontal line may move up and down in the field of view dependent upon the location of the point of light emitted by the first laser 230. This "horizon line" separates the near field from the background. The CPU of the vehicle may receive instruction to maneuver in order to avoid objects in the near field.

FIG. 5 illustrates an example embodiment of the field of view 300 divided into quadrants by the horizontal line 310 and the vertical line 320. As shown, the matrix of light points 330 is interpreted by the GPU/CPU to establish the location of objects 335 within the field of view such that they may be avoided. The data generated by the dual LiDAR system may be recorded for use in creating detailed bathymetric maps of the sea floor using a structure from motion algorithm.

The use of two different wavelengths of laser light enables a clear distinction between the single point 245 and the matrix of points 330 to maintain an accurate indication of speed and altitude, while also being able to readily interpret the matrix of laser light points through the image sensor field of view.

Using embodiments described herein for sea floor mapping, embodiments may traverse a sea floor at a considerably higher speed than possible using SONAR mapping due to the limitations of SONAR. As such, embodiments described herein are capable of mapping a larger area in a shorter amount of time rendering embodiments considerably more efficient and effective at covering large swaths of area in a compressed time allotment.

Locating

While embodiments have been described as capable of efficient mapping of a sea floor, it is imperative that an AUV that is generating the mapping data is able to accurately determine and maintain its location to be able to properly correlate the mapped sea floor with a latitude and longitude or other global measurement metric. Conventional locationing means, such as global positioning satellite based systems are unreliable under water due to signal refraction and complete loss of signal at relatively shallow depths. As such, embodiments described herein may use an Inertial Navigation System (INS) using an onboard compass, gyrometer, accelerometer, and pressure transducer that produce information that can be processed by the CPU/GPU and interpreted by software specifically developed for the described system. The INS as described herein may be an advanced dead reckoning system that may have some degree of error. One method of reducing error is using the INS in conjunction with the LiDAR system to determine the speed of the AUV relative to the sea floor to correct/verify the speed of the INS system. Embodiments described herein may be configured to detect drift caused by side currents using the INS including the three-axis gyrometer and the three-axis accelerometer, along with a compass. The AUV may compensate for side current by tacking into the current in the same manner that an aircraft tacks into the wind. An algorithm for tacking into the current may be derived from algorithms used for aircraft tacking into the wind.

The Swarm

A "swarm" refers to a plurality of AUVs operating in cooperation with one another. As the sea floor is vast and each AUV can only cover a limited amount of surface in a given time, deploying a plurality or "swarm" of AUVs can maximize surface area coverage within a finite amount of time. Each AUV swarm is composed of a number of AUVs, each independent of the other members of the swarm with a preprogrammed search area to explore. The size and number of swarms is determined by the size and shape of the target area to be mapped. A typical swarm may consist of approximately 10-12 AUVs. Once the swarm has completed its data collection operations, the members of the swarm may be configured to surface and travel to a predetermined rendezvous point where they can be retrieved.

The size of the swarm will be determined by the size of the area to be covered. It is expected that each AUV will map approximately 36 km$^2$ during a 10-hour data collection window dependent on water visibility and currents. The search area for the swarm may be established based on GPS coordinates prior to deployment of the swarm. Each member of the swarm may be assigned a prescribed search area; however, if an AUV is unable to complete its search function, the AUV may communicate with the deployment vessel, such as by acoustic modem. The deployment vessel may then launch a replacement AUV to complete the mission of the failed unit.

Swarms can be deployed from a single or multiple locations, autonomously or manually. A deployment vessel may be used to deploy a swarm, where each AUV may be deployed from a single location, or deployed as the deployment vessel traverses the surface of the water above the target area to be mapped. Optionally, aerial deployment may be possible where the AUVs are dropped into the water in which case the AUVs may be equipped with parachutes or other means to avoid substantial impact upon reaching the water surface. Once deployed, the swarm may perform the prescribed mapping. Once the mapping is complete, each member of the swarm may return to the surface and identify its location to a recovery vehicle, which may be the deployment vessel. Optionally, the AUVs may be programmed with a rendezvous point such that the swarm of AUVs may each return to the rendezvous point once mapping is completed.

The physical requirements of the AUVs include:
1 AUV, 1 meter length, roughly 9 kg each
  Each AUV is equipped with:
  Pressure vessel
  2×Dive planes
  2×Brushless motors
  2×Motor controllers
  4×10,000 mah Lipo Batteries
  Internal carriage to shift Center of Gravity (CG)
  CPU/GPU unit
  Video camera unit, 8 mp with wide angle lens
  LiDAR
  High intensity lights
  Inertial navigation system
    Microprocessor
    GPS receiver
    Electronic compass
    3 axis gyro
    3 axis accelerometer
    Pressure transducer
  Sensor package
    Temperature
    Fluorometer (optional)
  Emergency recovery gear
    FM transponder Example AUVs may be powered by four 10,000 mah Lithium Ion batteries. The batteries power the motors, lights, internal electronics package, and the additional sensor package which consists of: CPU/GPU unit, sensor package, LiDAR system, GPS, and video camera. The internal electronics draw approximately 1 amp of current. Each of the motors draws approximately 1.3 amps of current at minimum cruising speed. The lights draw an additional 0.5 amp. The CPU monitors power consumption and calculates the expected run time available at the current drawdown rate. The CPU uses this data to determine if the mission objectives can be completed at the rate of power consumption. The CPU will reserve enough power to travel to the recovery area. All abort scenarios are abort to the surface and travel to the rendezvous point.

The LiDAR system used is a proprietary design based on a low-power laser and a digital camera connected to a GPU/CPU unit. The laser is low-power to conserve battery life and to minimize danger to the marine environment. The LiDAR operates by projecting a matrix of laser light at a known angle from the video camera. The matrix consists of an ordered set of projected points. The GPU of the camera detects the points of light and measures each pixel to determine straight line distance, position, and size of the projected points. This data is used by the internal GPU/CPU to perform obstacle detection and avoidance and determine water visibility, as well as altitude above the bottom. The data is stored internally on a storage media for later extraction and computation of map information.

AUV Failure Mitigation

Failure of an AUV may be mitigated by other AUVs in a swarm through other AUVs covering the region of the failed AUV. There are two primary methods that an AUV may use to determine potential failure. A first mode of failure may be due to battery life. A battery monitor may be connected to the batteries that checks the amount of charge remaining in each battery against a mission clock that identifies how much of the mission remains. The monitor may also calculate the rate of drain on the batteries and compare that rate against the remaining time for the mission. If the monitor determines that there is insufficient battery life to complete the mission, the AUV will abort the mission before fully draining the batteries to allow the AUV sufficient power to return to a rendezvous point. Another failure mode may include a leak in the pressure vessel. A lead detector may monitor the internal humidity and pressure of the AUV. If there is a leak in the pressure vessel, then the internal humidity and the pressure will rise. Upon detection of a leak, the mission may be immediately aborted with the AUV returning to the rendezvous point. Abort scenarios generally return the AUV to the rendezvous point. Once at the surface, the AUV may activate a beacon to provide an indication of the failure and the location of the AUV for collection.

AUV Navigation

The planned ocean mapping route of the AUV is defined by a starting location (where the AUV is submerged in the ocean) a sequence of waypoints, and a destination (rally point). Each of these are defined by their latitude and longitude coordinates. This set of coordinates (starting point, waypoints, rally point) comprise the AUV's navigation path through the ocean, or "mission". The navigation may be performed based on the locating mechanism described above including an inertial navigation unit and a sensor array configured to provide dead reckoning navigation once submerged.

Initial Position Determination

Prior to execution of the mission, the AUV uses its onboard GPS to obtain a fix for its current position. This position is recorded as the mission starting point. The AUV is preloaded with mission instructions which are executed from the mission starting point. The mission instructions are loaded onto the AUV prior to transport to the area to be mapped. Each AUV is activated prior to deployment to obtain an initial GPS fix. Once the GPS fix has been obtained the AUV is deployed into the water to begin its mission.

Mission Navigation

Under normal conditions, the AUV executes its mission by navigating from the starting point, to each mission waypoint in sequence, and finally to the rally point (at the end of the mission). Upon arrival at each mission waypoint, the AUV will compute the estimated time to travel to the next waypoint and add the estimated time to travel from there to the rally point. It then compares that time duration to the estimated amount of battery life remaining. If battery level is sufficient it proceeds with the mission, if not then the AUV will abort the mission as described in Abort Conditions.

At the end of its mission, the AUV will surface close to the rally point. Upon surfacing, the AUV will obtain a GPS position fix, and proceed to navigate on the surface towards the rally point, obtaining additional GPS fixes as it travels. Recovery is performed at the rally point as the AUV arrives.

Position Monitoring/Drift Correction

Navigation from waypoint to waypoint requires management of AUV depth and heading. Depth is managed through monitoring a pressure transducer, which measures pressure changes. Heading is managed by use of the onboard Inertial Navigation System (INS). Ocean currents will require heading corrections for the AUV to remain on course. As the AUV travels, it constantly adjusts its heading by reading the INS data, comparing it to the desired course, and computing a drift compensation angle. The AUV then adds/subtracts this angle to find a new heading which compensates for drift.

Data Collection

Data collection will be conducted while the AUV travels along its designated search path. The CPU/GPU unit in each AUV includes an internal storage media where data will be stored. Data to be collected will include: full motion video, LiDAR data, depth, position, speed, internal temperature, internal humidity, and external temperature.

Full-motion, color video will be recorded at a resolution of 1280×1024 pixels. A single monochrome frame from the video will be sampled once per second and this image will be used to create a photo montage of the AUV's designated search area. The photo montage will be produced by a graphics server on the surface after retrieval.

LiDAR data will be used by the CPU/GPU for navigation and obstacle avoidance while the AUV is performing data collection. This data will also be stored on the internal storage media for later processing of image data and to produce bathymetric maps.

Depth, position, and speed will be used by the navigation program while the AUV is conducting data collection. This information will be logged and used to produce a 3D mesh of the mapping area. This mesh will be produced during the data processing window on shore or afloat.

Data may be stored internally in the AUV until it is retrieved and returned to shore. The internal CPU/GPU unit will be used to process some LiDAR data while the AUV is operating. Once extricated from the mission the CPU/GPU units of the AUVs will be connected together via a wireless network to produce a local cloud which may be used for further processing of the data.

Data correction may be performed after the data is collected, such as when an AUV may return to the surface of the water at an expected position, and subsequently determine that the actual location at the surface is different. While an initial position of the AUV at the surface may be positively determined by the AUV using available satellite navigation methods or other such methods available at the surface, once submerged, the navigation relies upon the INU and dead reckoning. The navigational information collected while below the surface of the water, such as the position calculations, accelerations, turns, drift, etc., which are recorded during data collection, can later be adjusted based on an offset of the actual final location of the AUV versus an anticipated final location of the AUV. For example, if the AUV surfaces ten feet from its expected home position and it ran for two hours collecting data, then the error is averaged to five feet of error accumulated per hour of operation. In actual operation; however, the amount of expected error is on the order of inches per hour of operation based on the specifications of the electronics used and described above. Most errors stem from instantaneous accelerations that may be too short in duration for the data sample rate to detect.

Sensors may be checked onboard the AUV to ensure data integrity from the sensors. Rotational motion can be checked using the electronic compass and the three-axis gyrometers. Changes in depth can be checked using the three-axis accelerometer and the depth sensor. Likewise, changes in pitch can be checked using the three-axis gyrometer and the depth sensor.

Deployment

The deployment vehicle or surface vessel may be, for example, a foot pontoon boat that has been modified to operate autonomously to deploy and recover the AUV swarm. The primary components could be 3 aluminum pontoons coated in a high impact plastic, cross members, AUV deployment rack, control console, outboard motor, and electronics. The vessel can be provisioned and launched from a dock or beach location. Each AUV can be loaded by hand into the deployment rack.

The surface vessel may have an inertial navigation package, autopilot, dynamic positioning equipment, radar, LiDAR, GPS, and autonomous controls. The AUV swarms are loaded onto the vessel on shore and then driven to the mapping area. While on the shore each AUV is preloaded with a search pattern for a designated area, internal clocks are synchronized, and initial coordinates are loaded. The AUV's INS system is active while they are being transported to the mapping area.

The AUVs are stored horizontally in a rack near the center of gravity of the surface vessel. Each rack can contain up to 24 AUVs. They are held in the rack by a capture mechanism which can be released to drop an AUV over a designated target.

Once deployed, each AUV begins diving to its mission depth, and traveling to its designated search area. As the AUV approaches its mission depth, it will level off and begin following the contour of the bottom along the designated search path. LiDAR, video, and environmental sensors will be activated and the data collection process will begin.

Recovery

Once the AUVs have completed their data collection operations, they will move to a preprogrammed recovery point. The surface vessel will be waiting at the recovery point and will maintain position using its dynamic positioning system. The surface vessel could be controlled by the same CPU/GPU unit that controls the AUVs, or manually operated. This CPU/GPU would have the ability to perform object and color recognition and be able to identify and retrieve the AUV swarm, should the recovery vessel be operated autonomously.

The recovery mechanism could consist of a metal cage which is lowered through the deck of the recovery vessel near the center of gravity. Each AUV will navigate to a position near the bow of the recovery vessel and then drive itself between the pontoons and into the cage. When the recovery vessel detects that an AUV has entered the recovery cage it will raise and empty the AUV onto a storage rack. The cage will then be lowered into the water and the vessel will wait for the next AUV to enter.

Once the AUVs have been recovered, the surface vessel will take inventory to determine if all AUVs are accounted for. If so, the vessel will take the fastest route to shore. The AUVs will be off loaded and replenished for redeployment. Replenishing the AUV simply involves replacing the internal storage media with the collected data and replacing it with a storage media without previously collected data, but with new instructions for a new search area, and replacement of the internal batteries.

Abort Conditions

Each AUV evaluates its status based upon the intended search pattern, the waypoints designated, power consumption, navigation, and expected battery life. If the AUV determines that it is unable to complete the mission then it will abort the mission and travel to the recovery area.

Once on the surface the aborted AUV will attempt to navigate to the rendezvous point to be retrieved. The rest of the swarm will continue to gather data and proceed normally to the rendezvous point.

CPU/GPU

The CPU/GPU may be embodied by a number of different computing/processing systems which may be specifically configured to perform the operations described above. However, FIG. 6 illustrates a schematic diagram of an example apparatus which may be implemented to perform the functions described herein. As shown, the apparatus 400 may be embodied by or associated with any of a variety of computing devices that include or are otherwise associated with an AUV as described above. For example, the computing device may be a CPU/GPU which may at least partially control autonomous or semi-autonomous features of the AUV. The apparatus 400 may be equipped with any number of sensors 420, such as a global positioning system (GPS), accelerometer, image sensor, LiDAR (Light Distancing and Ranging) sensor, radar, pressure transducer, and/or gyroscope. Any of the sensors may be used to sense information regarding the movement, positioning, or orientation of the AUV for use in navigation assistance and/or to facilitate sea floor mapping, as described herein according to example embodiments. The apparatus 400 of example embodiments may be configured to control the navigational functions of the AUV, such as independent control of the motors driving the propellers and control of the counterweight system.

The apparatus 400 may include, be associated with, or may otherwise be in communication with a communication interface 440, processor 410, and/or a memory device 430. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 410 may be embodied in a number of different ways. For example, the processor may be embodied as one or more of various hardware processing means such as a microprocessor, a controller, a digital signal processor, or other processing circuitry including circuits such as an application specific integrated circuit, an field programmable gate array, a microcontroller unit, or the like.

The apparatus 400 of example embodiments may optionally include a communication interface 440 that may be any means such as a device or circuitry embodied in either hardware or a combination of hardware and software configured to receive and/or transmit data to/from other electronic devices, such as communicating between an AUV associated with the apparatus 400 and a deploying vessel or with other AUVs of the swarm. The communication may be performed over any available communication protocol, such as near field communication, cellular communication, sonar, Global System for Mobile Communications (GSM), or the like. The communications interface may optionally support wired communication for when the AUV is operating as a tethered vehicle or for communication with the apparatus 400 upon the AUVs return from mapping the sea floor.

The memory 430 may be configured for storage of bathymetric data received from the LiDAR systems described above, and may store navigational information such as a geographical area to map and rendezvous points for returning to after mapping is complete, for example. Optionally, the memory 430 may store computer program code for execution by the processor 410 to perform any of the aforementioned processes.

CONCLUSION

Many modifications and other embodiments of the inventions set forth herein will come to mind to one skilled in the art to which these inventions pertain having the benefit of the trainings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An autonomous underwater vehicle comprising:
a controller;
a body having a front end and a rear end and defining a cavity and a center of gravity;
a first dive plane extending from the body proximate the center of gravity, wherein the first dive plane is attached at a first end to the body;
a second dive plane extending from the body substantially opposite of the first dive plane proximate the center of gravity, wherein the second dive plane is attached at a first end to the body;
a first propeller disposed proximate a second end of the first dive plane, opposite the first end of the first dive plane;
a second propeller disposed proximate a second end of the second dive plane, opposite the first end of the second dive plane;
a counterweight disposed within the cavity configured to be moved between the front end and the rear end of the body;
wherein a fore-aft pitch of the body of the autonomous underwater vehicle is controlled by the controller through movement of the counterweight toward the front end or the rear end of the body, and wherein turning of the body is controlled by the controller using the first propeller and the second propeller.

2. The autonomous underwater vehicle of claim 1, wherein the counterweight is disposed proximate the center of gravity of the body between the front end and the rear end in response to no pitch being commanded by the controller.

3. The autonomous underwater vehicle of claim 1, wherein the controller is configured to cause the autonomous underwater vehicle to turn in response to differential control of the first propeller and the second propeller.

4. The autonomous underwater vehicle of claim 1, wherein the controller is configured to cause the front end of the body to pitch up in response to causing the counterweight to move toward the rear end of the body.

5. The autonomous underwater vehicle of claim 1, further comprising:
a first laser and a second laser, wherein the first laser projects a first laser beam to a first spot in front of the autonomous underwater vehicle, and wherein the second laser projects an array of laser beams to a field of view in front of the autonomous underwater vehicle.

6. The autonomous underwater vehicle of claim 5, wherein the first laser is of a first wavelength, and the second laser is of a second wavelength, different from the first wavelength.

7. The autonomous vehicle of claim 6, further comprising an image capture device, wherein the image capture device comprises a field of view, wherein the first spot and the field of view of the first array of laser beams are within a field of view of the image capture device, wherein the image capture device is configured to map a surface covered by the field of view of the first array of laser beams.

8. The autonomous vehicle of claim 7, wherein the controller is configured to receive data from the image sensor device, process the data, and generate bathymetric data of the surface covered by the field of view of the first array of laser beams.

9. The autonomous underwater vehicle of claim 1, further comprising:
a gyrometer;
an accelerometer;
a compass; and
a pressure transducer, wherein the controller is configured to process data from the gyrometer, accelerometer, compass, and pressure transducer to facilitate autonomous navigation of the autonomous underwater vehicle within a predetermined area under water.

10. The autonomous underwater vehicle of claim 1, further comprising:
a first LiDAR (Light Distancing and Ranging) system; and
a second LiDAR system;
wherein the first LiDAR system projects a single laser beam in front of the body and is configured to determine a height above a sea floor;
wherein the second LiDAR system projects an array of laser beams in front of the body and is configured to detect objects in front of the autonomous underwater vehicle.

11. The autonomous underwater vehicle of claim 10, wherein the second LiDAR system is configured to produce bathymetric data of the sea floor for the predetermined area under water.

12. The autonomous underwater vehicle of claim 11, wherein the controller is configured to, in response to the second LiDAR system producing bathymetric data of the sea floor for the predetermined area under water, causing the autonomous underwater vehicle to ascend to a surface of the water and travel to a predetermined location.

13. The autonomous underwater vehicle of claim 10, wherein the first LiDAR system operates at a first wavelength of light and the second LiDAR system operates at a second wavelength of light, different from the first wavelength.

14. An autonomous underwater vehicle comprising:
a body having a front end and a rear end and defining a cavity and a center of gravity;
a first dive plane extending from the body, wherein the first dive plane is attached at a first end to the body;
a second dive plane extending from the body substantially opposite of the first dive plane, wherein the second dive plane is attached at a first end to the body;
a first propeller disposed proximate a second end of the first dive plane, opposite the first end of the first dive plane;
a second propeller disposed proximate a second end of the second dive plane, opposite the first end of the second dive plane; and
a counterweight disposed within the cavity configured to be moved forward of a center of gravity of the body toward the front end of the body and rearward of the center of gravity toward the rear end of the body;
wherein the front end of the body is configured to move up in response to the counterweight moving rearward of the center of gravity of the body, and the rear end of the body is configured to move up in response to the counterweight moving forward of the center of gravity of the body, and wherein the autonomous underwater vehicle is controlled with no moving control surfaces.

15. The autonomous underwater vehicle of claim 14, further comprising a rail along which the counterweight is configured to move.

16. The autonomous underwater vehicle of claim 14, wherein the body is configured to remain level in response to the counterweight being positioned at the center of gravity of the body.

17. The autonomous underwater vehicle of claim 14, further comprising at least one propeller, wherein the autonomous underwater vehicle is configured to ascend in water in response to the counterweight being disposed rearward of the center of gravity and the propeller producing forward motion.

\* \* \* \* \*